Dec. 16, 1930.  E. E. JOHNSON  1,784,966
METHOD OF MAKING COUPLING MEMBERS
Filed March 25, 1929
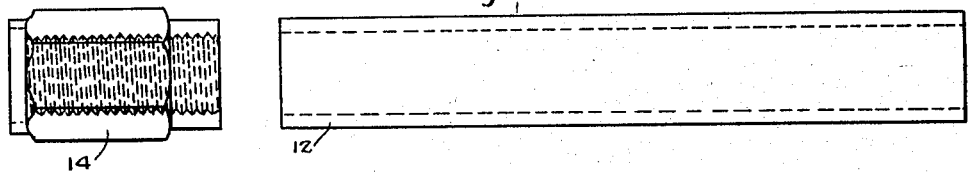
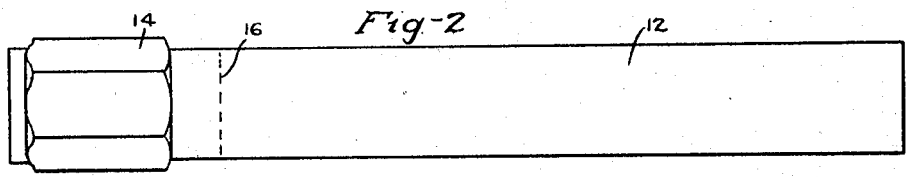
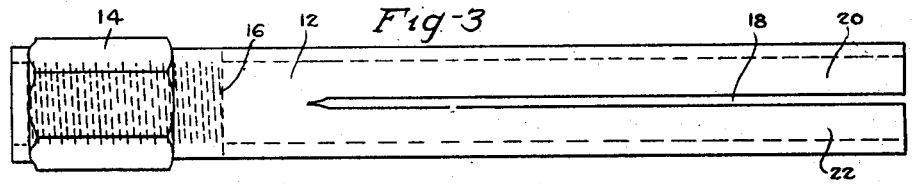
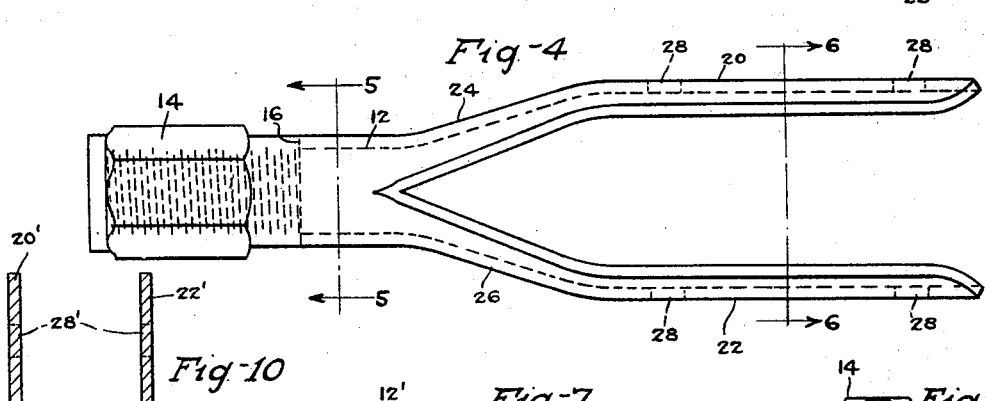
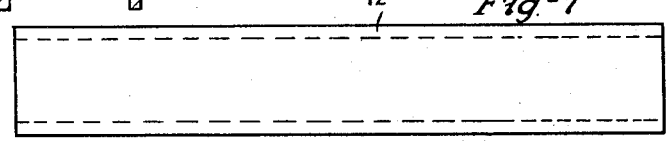
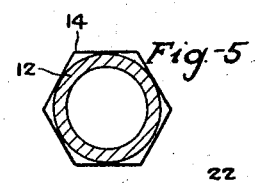
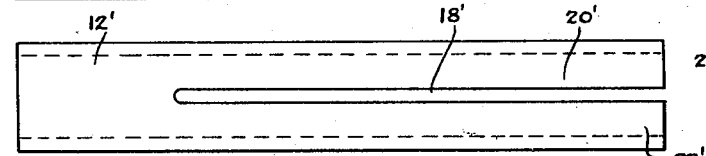
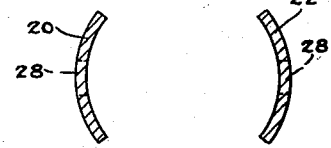
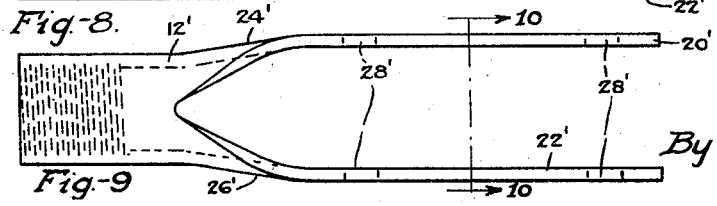
Inventor:
E. E. Johnson.
By Whiteley and Ruckman
Attorneys.

Patented Dec. 16, 1930

1,784,966

UNITED STATES PATENT OFFICE

EDWARD E. JOHNSON, OF ST. PAUL, MINNESOTA

METHOD OF MAKING COUPLING MEMBERS

Application filed March 25, 1929. Serial No. 349,683.

My invention relates to methods of making coupling members, and has for an object to provide a coupling member having wings adapted to clasp and be secured to rods or shafts such as wooden pump rods. A particular object of the invention is to provide a coupling member of this character which will be extremely strong and durable and which may be readily manufactured in an economical and expeditious manner. Broadly considered, my invention consists in providing a pipe section, splitting the pipe section for a portion of its length, and separating the split parts to form clasping wings.

The full objects and advantages of my invention will appear in connection with the detailed description thereof, and the novel features of my inventive idea will be particularly pointed out in the claims.

In the accompanying drawings which illustrate the manufacture of my coupling member, Fig. 1 is an elevational view of two elements of a coupling member before they are secured together. Fig. 2 is an elevational view showing the two elements secured together. Fig. 3 is an elevational view showing the coupling member after an end portion thereof has been split. Fig. 4 is an elevational view showing the split portion expanded. Fig. 5 is a view in cross section on the line 5—5 of Fig. 4. Fig. 6 is a view in cross section on the line 6—6 of Fig. 4. Fig. 7 is an elevational view showing a blank used in making another form of the invention. Fig. 8 is an elevational view showing the blank after an end portion thereof has been split. Fig. 9 is an elevational view showing the split portion expanded and the unsplit end provided with threads. Fig. 10 is a view in cross section on the line 10—10 of Fig. 9.

In carrying out my invention, according to the first form which is disclosed in the drawings, I provide two elements consisting of a pipe section 12 of the desired length and size and an attaching element 14 which is provided with threads. The element 14 is preferably angular in cross section so that it may be readily grasped by a wrench. The two elements 12 and 14 are secured together preferably by butt-welding as shown in Fig. 2 in which the dotted line 16 indicates the line of weld. As shown in Fig. 3, the element 12 is split in well known manner by a longitudinal line of cut 18 which extends from the outer end, stopping short of the line of weld 16 and preferably dividing the element 12 for the greater portion of its length into equal parts to form wings 20 and 22. The wings 20 and 22 are expanded or separated from each other as shown in Fig. 4 in such manner that the wings merge into the uncut portion of the element 12 by means of inclined portions 24 and 26. The wings 20 and 22 are preferably pressed in such manner as to be left somewhat rounded as best shown in Fig. 6, in order that they may fit upon a round rod or shaft such as a pump rod. Holes 28 are drilled in the wings 20 and 22 for the purpose of securing the rod in usual manner by rivets or bolts. It will be understood as a matter of course that the element 14 may be provided with either male or female threads and that two of the members may be screwed together by means of these threads.

In connection with the form shown in Figs. 7 to 10, the manufacturing process is substantially the same as that already described except that no separate threaded element is provided for welding to the pipe section. A pipe section 12' is provided with a split 18' similar to that provided for the pipe section 12, and the wings 20' and 22' formed by the split portions are expanded or separated from each other. As shown in Figs. 9 and 10, the expanded parts or wings may be pressed flat so as to fit upon a square rod or shaft. As shown in Fig. 9, the threads are formed directly on the unsplit end of the pipe section instead of being formed on a separate element which is welded to the pipe section. The threads obviously may be either male or female threads so that two of the coupling members may be secured together.

I claim:

1. The method of making coupling members which consists in providing a pipe section, splitting said section for the greater portion of its length, and separating the split parts to form clasping wings extending from one end of said section to a position comparatively close to the other end of said section.

2. The method of making coupling members which consists in providing a pipe section, splitting said section for the greater portion of its length, separating the split parts to form clasping wings extending from one end of said section to a position comparatively close to the other end of said section, and providing threads for the unsplit end of the pipe section.

3. The method of making coupling members which consists in providing a pipe section, splitting said section for the greater portion of its length, separating the split parts to form clasping wings extending from one end of said section to a position comparatively close to the other end of said section, and providing said wings with a plurality of holes for use in securing a rod rigidly between the wings.

4. The method of making coupling members which consists in providing a pipe section, welding an attaching element to one end of said pipe section, splitting said pipe section for a portion of its length, and separating the split parts to form wings.

5. The method of making coupling members which consists in providing a pipe section, threading an attaching element, butt-welding said attaching element to one end of said pipe section, splitting said pipe section for a portion of its length, and separating the split parts to form wings.

In testimony whereof I hereunto affix my signature.

EDWARD E. JOHNSON.